US012225620B2

(12) United States Patent
Sakashita

(10) Patent No.: US 12,225,620 B2
(45) Date of Patent: Feb. 11, 2025

(54) ELECTRONIC APPARATUS AND METHOD FOR CONTROLLING THE SAME

(71) Applicant: SEIKO EPSON CORPORATION, Tokyo (JP)

(72) Inventor: Shinya Sakashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 453 days.

(21) Appl. No.: 17/656,243

(22) Filed: Mar. 24, 2022

(65) Prior Publication Data

US 2022/0312547 A1    Sep. 29, 2022

(30) Foreign Application Priority Data

Mar. 26, 2021   (JP) .................................. 2021-053092

(51) Int. Cl.
| | |
|---|---|
| *H04W 76/30* | (2018.01) |
| *G06F 1/26* | (2006.01) |
| *H04W 4/80* | (2018.01) |
| *H04W 88/06* | (2009.01) |

(52) U.S. Cl.
CPC ............ *H04W 76/30* (2018.02); *G06F 1/266* (2013.01); *H04W 4/80* (2018.02); *H04W 88/06* (2013.01)

(58) Field of Classification Search
CPC ....... H04W 76/30; H04W 4/80; H04W 88/06; G06F 1/266
See application file for complete search history.

(56) References Cited

U.S. PATENT DOCUMENTS

| | | | | |
|---|---|---|---|---|
| 2007/0061436 A1* | 3/2007 | Bae | ..................... | H04L 12/1881 709/223 |
| 2013/0045728 A1* | 2/2013 | Iverson | ................... | H04M 1/04 455/417 |
| 2016/0321206 A1* | 11/2016 | Kim | ..................... | G06F 13/4282 |
| 2020/0136886 A1 | 4/2020 | Tanimura | | |

FOREIGN PATENT DOCUMENTS

JP    2020-071083 A    5/2020

* cited by examiner

*Primary Examiner* — Farid Seyedvosoghi
(74) *Attorney, Agent, or Firm* — Global IP Counselors, LLP

(57) ABSTRACT

An electronic apparatus includes a first communication section that performs first communication in a wireless manner based on a first communication standard, a second communication section that performs second communication in a wired manner based on a second communication standard different from the first communication standard, and a controller that controls the first communication section and the second communication section. When a connection through the second communication is performed during a connection through the first communication, the first communication is not disconnected until a predetermined packet is received through the second communication and is disconnected when the predetermined packet is received through the second communication.

9 Claims, 4 Drawing Sheets

ELECTRONIC APPARATUS AND METHOD FOR CONTROLLING THE SAME

The present application is based on, and claims priority from JP Application Serial Number 2021-053092, filed Mar. 26, 2021, the disclosure of which is hereby incorporated by reference herein in its entirety.

BACKGROUND

1. Technical Field

The present disclosure relates to an electronic apparatus and a method for controlling the electronic apparatus.

2. Related Art

In general, electronic apparatuses that perform communication connection through a wired network or a wireless network have been widely used. JP-A-2020-071083 discloses a method for causing an electronic apparatus operated in a limited work space to be connected to a personal computer or a cloud server through a wireless network.

JP-A-2020-071083 does not disclose a method for causing an electronic apparatus to enable wireless communication and wired communication and perform switching between the wireless communication and the wired communication.

SUMMARY

According to an aspect of the present disclosure, an electronic apparatus includes a first communication section that performs first communication in a wireless manner based on a first communication standard, a second communication section that performs second communication in a wired manner based on a second communication standard that is different from the first communication standard, and a controller that controls the first communication section and the second communication section. The controller does not disconnect, when connection in the second communication is performed during connection in the first communication, the first communication until a predetermined packet is received through the second communication, and disconnects the first communication when receiving the predetermined packet through the second communication.

According to another aspect of the present disclosure, a method for controlling an electronic apparatus including a first communication section that performs first communication in a wireless manner based on a first communication standard, and a second communication section that performs second communication in a wired manner based on a second communication standard that is different from the first communication standard includes not disconnecting, when connection in the second communication is performed during connection in the first communication, the first communication until a predetermined packet is received through the second communication, and disconnecting the first communication when receiving the predetermined packet through the second communication.

DESCRIPTION OF EXEMPLARY EMBODIMENTS

Hereinafter, an embodiment will be described. Note that the embodiment below does not unreasonably limit content of the present disclosure disclosed in claims. It is not necessarily the case that all components described in this embodiment are requirements of the present disclosure.

Figure 1:
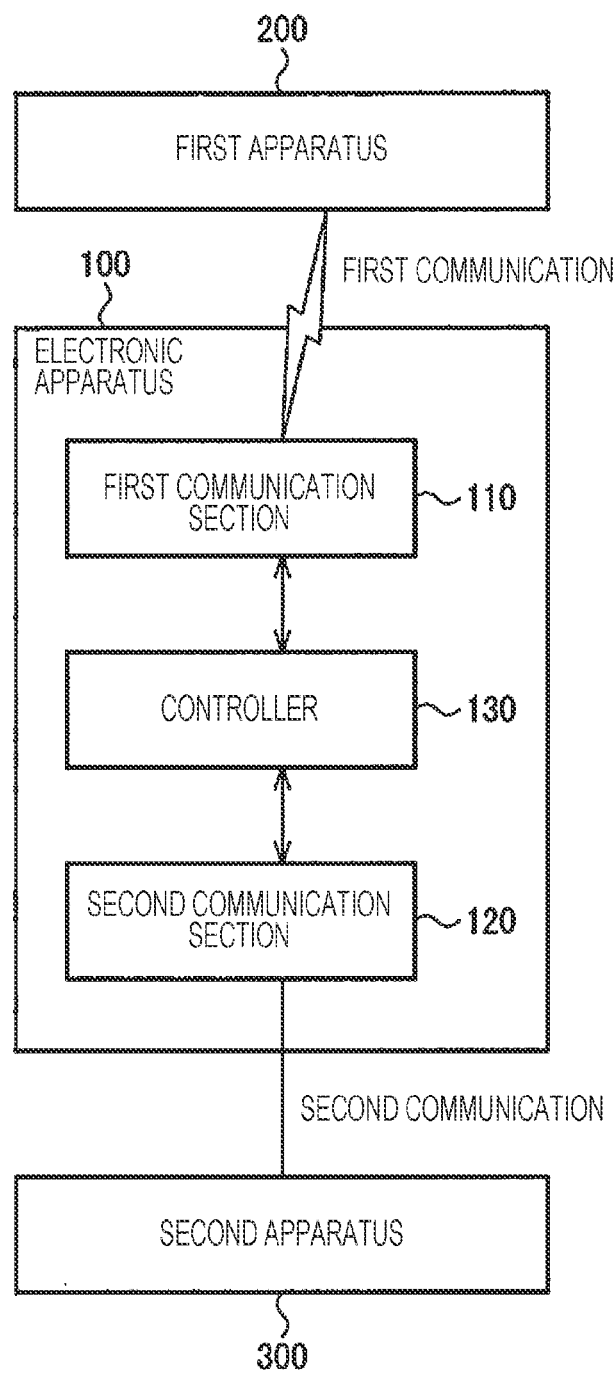
FIG. 1 is a block diagram illustrating an example of a configuration of an electronic apparatus.

FIG. 1 is a block diagram illustrating an example of a configuration of an electronic apparatus 100 according to this embodiment. The electronic apparatus 100 includes a first communication section 110, a second communication section 120, and a controller 130. Although the electronic apparatus 100 is a colorimetric apparatus, for example, the electronic apparatus 100 may be a personal computer, a wearable apparatus, a biological information measuring apparatus, a robot, a video apparatus, a physical quantity measuring apparatus, a printer, or the like. Note that examples of the wearable apparatus include a smart watch and an activity tracker. Furthermore, examples of the biological information measuring apparatus include a pulse monitor and a pedometer. Examples of the video apparatus include a camera and a projector. Examples of the physical quantity measuring apparatus include a thermometer and a weight scale. Moreover, the printer described herein includes a multifunction peripheral. The multifunction peripheral is a printer including functions other than a printer function, and the functions other than a printer function include a copy function, a facsimile function, and a scanner function. However, other functions may be included.

The first communication section 110 is a communication interface that performs first communication in a wireless manner based on a first communication standard. The first communication section 110 may be realized by a solo semiconductor device having a communication function based on the first communication standard or may be realized as a portion of a function of a semiconductor device having other functions. Although the first communication standard herein is Bluetooth (registered trademark), for example, the first communication standard may be another wireless communication standard, such as Wi-Fi (Wireless Fidelity) (registered trademark), Zigbee (registered trademark), NFC (Near Field Communication), or ANT+ (registered trademark). Note that Bluetooth (registered trademark) herein includes BLE (Bluetooth Low Energy) which is a wireless communication standard operating with low power consumption.

The second communication section 120 is a communication interface that performs second communication in a wired manner based on a second communication standard. The second communication section 120 may be realized by a solo semiconductor device having a communication function based on the second communication standard or may be realized as a portion of a function of a semiconductor device having other functions. Although the second communication standard herein is the universal serial bus (USB), the second communication standard may be other wired communication standards, such as PoE (Power over Ethernet) or PLC (Power Line Communications). Furthermore, although the wired communication herein is specifically constituted by a single cable, a plurality of cables may be employed. Furthermore, although the second communication standard is a wired communication standard capable of transmitting both signals and electric power by a single cable, the second communication standard may be a wired communication standard that transmits only signals by a single cable.

The controller 130 performs control on the various sections included in the electronic apparatus 100, such as the first communication section 110 and the second communication section 120, and a process of executing a job. Examples of the job include a command or an instruction issued by the first apparatus 200 that is an external apparatus to the electronic apparatus 100 through the first communication and a command or an instruction issued by the second apparatus 300 that is an external apparatus to the electronic apparatus 100 through the second communication. When the electronic apparatus 100 is a colorimetric apparatus, for example, the examples of the job include a command or an instruction issued by the first apparatus 200 in which an application program capable of operating the colorimetric apparatus is installed or the second apparatus 300 in which the application program is installed. The same is true of an electronic apparatus 100 that is other than the colorimetric apparatus. Although the external apparatus is a mobile terminal device, such as a smartphone, the external apparatus may be a personal computer or the like. Note that the controller 130 may perform a process of executing a job without using the first communication section 110 or the second communication section 120. Examples of the process of executing a job without using the first communication section 110 or the second communication section 120 include a process of executing a job through an operation performed on an operation section, not illustrated.

For example, the controller 130 may include a plurality of central processing units (CPUs), such as a main CPU and a sub CPU. The main CPU controls the sections included in the electronic apparatus 100 and the entire electronic apparatus 100. The sub CPU controls communication performed by the first communication section 110 and the second communication section 120, for example. Alternatively, when the electronic apparatus 100 is a colorimetric apparatus, a CPU that performs various processes associated with colorimetry may be further included. The controller 130 of this embodiment may be configured by hardware described below. The hardware may include at least one of a circuit that processes digital signals and a circuit that processes analog signals. For example, the hardware is configured by at least one circuit device or at least one circuit element implemented on a circuit substrate. Note that examples of the circuit device include an integrated circuit device. Furthermore, examples of the circuit element include an active element, such as a transistor, and a passive element, such as a resistor or a capacitor.

The controller 130 may be realized by a processor below. The controller 130 of this embodiment includes a memory, not illustrated, storing information and a processor operating based on the information stored in the memory. Note that examples of the information include programs and various data. Although the programs include the application program associated with colorimetry described above when the electronic apparatus 100 is a colorimetric apparatus, the programs further include programs associated with control on the first communication and the second communication described below. Examples of the data include data associated with conditions for colorimetry when the electronic apparatus 100 is a colorimetric apparatus. The processor includes hardware. Furthermore, as the processor, various types of processor may be used, such as a CPU, a GPU (graphics processing unit), and a DSP (digital signal processor).

As described above, when the electronic apparatus 100 of this embodiment includes a sensor, not illustrated, or an imaging apparatus, not illustrated, for example, since the electronic apparatus 100 includes the first communication section 110, the electronic apparatus 100 may transmit measured data or captured image data stored in a storage section, not illustrated, in the electronic apparatus 100 to the first apparatus 200 through the first communication. Accordingly, a storage region of the storage section may be ensured. Furthermore, when the user operates the first apparatus 200, for example, so as to transmit a job to the electronic apparatus 100 through the first communication in the wireless manner, the user may operate the electronic apparatus 100 through the first apparatus 200. Specifically, the colorimetric apparatus may be realized by operating a colorimetric apparatus by a smartphone in accordance with an application program installed in the smartphone when the user causes a colorimetric portion of a colorimetric apparatus that is the electronic apparatus 100 holding on one hand to face a predetermined colorimetry target while operating the smartphone that is the first apparatus 200 held on the other hand. Furthermore, the user may perform colorimetry on a colorimetry object, such as a printed matter, in accordance with the application program installed in a personal computer serving as the first apparatus 200 while fixing the colorimetric apparatus serving as the electronic apparatus 100 in a predetermined position. In this case, when the second communication that is wired communication is employed in measurement, a cable used in the wired communication and a shadow of the cable may disturb the colorimetry. However, when the colorimetric apparatus is used in the first communication, cables that disturbs colorimetry are not used, and therefore, degradation of colorimetric quality may be avoided. Note that, when the electronic apparatus 100 is small, a battery, not illustrated, mounted therein is also small, and therefore, capacity of the battery is limited. Furthermore, when the first communication standard is a standard of Bluetooth, for example, the first apparatus 200 may not supply electric power to the electronic apparatus 100. Therefore, the user preferably uses the electronic apparatus 100 through the first communication based on a standard of low power consumption. Note that the battery herein is a chargeable secondary battery, for example, or may be a primary battery.

Furthermore, when the first communication standard is the standard of Wi-Fi described above, for example, the electronic apparatus 100 and the first apparatus 200 may realize the first communication through an external access point not illustrated. On the other hand, when the first communication standard is the standard of Bluetooth, for example, the electronic apparatus 100 and the first apparatus 200 may realize the first communication without using an external access point. For example, the user may establish connection via the first communication by performing a pairing process between the electronic apparatus 100 and the first apparatus 200 based on the standard of Bluetooth. Note that, a term "communication connection based on a communication standard" is simply referred to as "connection" where appropriate in a description below, and electric connection may be simply referred to as "coupling" where appropriate. Furthermore, the user may automatically connect the electronic apparatus 100 and the first apparatus 200 to each other without inputting a password when connection between the electronic apparatus 100 and the first apparatus 200 is performed again via the first communication after the communication connection between the electronic apparatus 100 and the first apparatus 200 is disconnected.

Furthermore, since the electronic apparatus 100 of this embodiment includes the second communication section 120, the electronic apparatus 100 may transmit measured data or captured image data stored in the storage section, not illustrated, in the electronic apparatus 100 to the second apparatus 300 through the second communication. Furthermore, when the electronic apparatus 100 itself is small, and therefore, a captured image or the like may not be displayed large, for example, the electronic apparatus 100 may transmit captured image data to the personal computer serving as the second apparatus 300 via the second communication so that the captured image data may be displayed large in a display section, not illustrated, of the second apparatus 300. Furthermore, when the second apparatus 300 is coupled to the electronic apparatus 100 by a second communication cable described below, the user may supply electric power to the battery, not illustrated, of the electronic apparatus 100 from a battery, not illustrated, of the second apparatus 300 through a power transmission line of the second communication cable. Since it is difficult to continuously use the electronic apparatus 100 only by the connection through the first communication as described above, for example, use of the electronic apparatus 100 through the connection by the second communication is also required. However, as described above, the user may desire to use the electronic apparatus 100 with a minimum use of the connection in the second communication.

Here, some electronic apparatuses 100 may not simultaneously perform the connection through the first communication and the connection through the second communication. Specifically, when the connection through the first communication and the connection through the second communication conflict with each other, the connection through the second communication is preferentially performed as a specification in some cases. Therefore, when the user desires to use the second communication while being using the electronic apparatus 100 through the connection in the first communication, the user disconnects the first communication once before performing the connection through the second communication. Alternatively, when the second communication cable is coupled to the second communication section 120 while the user is using the electronic apparatus 100 through the connection in the first communication, the connection through the first communication may be automatically disconnected and the connection through the second communication may be started. In this case, the electronic apparatus 100 might not cope with the demand of the user described above. Therefore, when the method of this embodiment described below is employed, minimum connection by the second communication may be realized.

Figure 2:
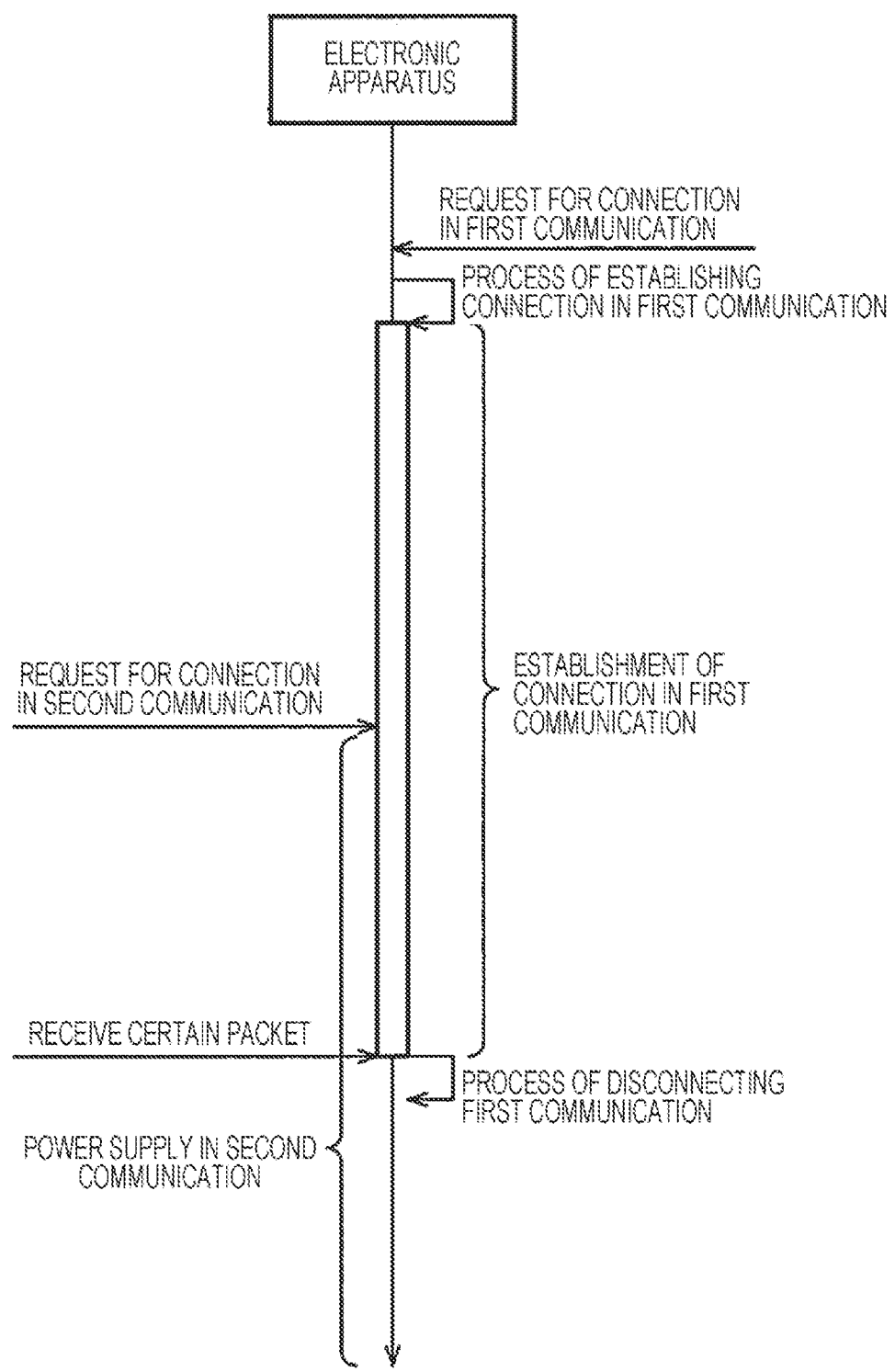
FIG. 2 is a diagram illustrating an example of a flow of a process performed by the electronic apparatus.

FIG. 2 is a diagram illustrating a flow of a process performed by the electronic apparatus 100 according to this embodiment. When receiving a request for connection through the first communication, the controller 130 performs a first communication connection establishing process. By this, the connection establishment in the first communication is performed. The term "connection establishment in the first communication" indicates connection establishment by the paring described above when the first communication standard is the standard of Bluetooth, for example. However, when another communication standard is employed, an appropriate method is used.

Thereafter, the electronic apparatus 100 receives a request for connection in the second communication at a predetermined timing. Here, when the connection through the first communication and the connection through the second communication conflict with each other, the second communication is preferentially performed in the electronic apparatus 100 of this embodiment as the specification. The predetermined timing indicates a timing when the second communication cable is coupled to the second communication section 120, for example. The second communication cable is a USB cable described below with reference to FIG. 3 when the second communication standard is the standard of the USB. When the process of connecting the electronic apparatus 100 with the second apparatus 300 at the predetermined timing may not be required in the second communication standard, for example, the controller 130 does not disconnect the first communication. Furthermore, when the process of connecting the electronic apparatus 100 to the second apparatus 300 is required to be started at the predetermined timing in the second communication standard, for example, the controller 130 discards the request for connecting in the second communication. By this, the continuous connection in the first communication is realized at the predetermined timing.

Note that, when the second communication cable includes a power transmission line, the electronic apparatus 100 may start charge of the battery, not illustrated, of the electronic apparatus 100 through the power transmission line of the second communication cable since the second communication cable and the second communication section 120 are physically coupled to each other.

Subsequently, the controller 130 performs a first communication disconnecting process at a timing when receiving a predetermined packet through the second communication. Specifically, the controller 130 may realize the first communication disconnecting process by performing a process of outputting a signal for instructing a disconnection of the first communication to the first communication section 110. Alternatively, the controller 130 may realize the first communication disconnecting process by outputting a predetermined interruption signal to the first communication section 110 after receiving a predetermined packet through the second communication and performing a process of disabling the first communication, for example. Note that the process of disabling the first communication is a process of turning on a predetermined flag, for example. The process of establishing connection through the second communication is performed at this timing, and the connection between the electronic apparatus 100 and the second apparatus 300 through the second communication is established. In other words, the connection through the first communication is continued while the second communication cable is coupled to the second communication section 120 in the electronic apparatus 100 until the electronic apparatus 100 receives the predetermined packet. Furthermore, when the second communication cable includes the power transmission line as described above, the connection through the first communication is continued while the battery is charged until the electronic apparatus 100 receives the predetermined packet.

As described above, the electronic apparatus 100 of this embodiment includes the first communication section 110 that performs the first communication in the wireless manner based on the first communication standard, the second communication section 120 that performs the second communication in the wired manner based on the second communication standard different from the first communication standard, and the controller 130 that controls the first communication section 110 and the second communication section 120. When the connection through the second communication is performed during the connection through the first communication, the controller 130 does not disconnect the first communication before receiving the predetermined packet through the second communication but disconnects the first communication when receiving the predetermined packet through the second communication.

In general, in an apparatus that preferentially performs the second communication in the wired manner, the first communication in the wireless manner is automatically disconnected when the second cable is coupled, and therefore, usability is degraded. However, according to this embodiment, in the electronic apparatus 100 that preferentially performs the second communication in the wired manner, even when the second communication cable is coupled to the second communication section 120, the connection through the first communication may be continued until the predetermined packet is received. Accordingly, a degree of freedom of switching from the first communication to the second communication in the electronic apparatus 100 is increased. For example, even when the user couples the second apparatus 300 to the second communication section 120 through the second communication cable, the user may use the electronic apparatus 100 while the connection through the first communication is continued, and furthermore, may switches the connection through the first communication to the connection through the second communication at a desired timing. Accordingly, usability of the electronic apparatus 100 may be improved. Furthermore, when the second communication cable includes the power transmission line, the connection through the first communication is continued while the battery is charged, and therefore, the user may use the electronic apparatus 100 while the connection through the first communication is continued without taking consumption of the battery into consideration.

Furthermore, it is assumed that the user uses the electronic apparatus 100 by the connection through the first communication immediately before the battery is fully consumed, and thereafter, the second communication cable is coupled. After the charge of the battery is terminated, the user detaches the second communication cable from the electronic apparatus 100 so that a state in which the second communication cable is not used is entered again and the use of the electronic apparatus 100 may be continued. Accordingly, when existence of the second communication cable disturbs use of the electronic apparatus 100, a state in which the user uses the electronic apparatus 100 including the second communication cable may be minimized, and therefore, usability of the electronic apparatus 100 may be improved. Note that the electronic apparatus 100 may be a colorimetric apparatus including a colorimetric portion not illustrated. As described above, a colorimetric apparatus employing the method of this embodiment may be used. Such a colorimetric apparatus has not been used.

Furthermore, the method of this embodiment may be realized as a method for controlling the electronic apparatus 100. That is, the method for controlling the electronic apparatus 100 of this embodiment means a method for controlling the electronic apparatus 100 including a first communication section that performs first communication in a wireless manner based on a first communication standard, and a second communication section that performs second communication in a wired manner based on a second communication standard different from the first communication standard. Furthermore, when a connection through the second communication is performed during a connection through the first communication, the first communication is not disconnected until a predetermined packet is received through the second communication but is disconnected when the predetermined packet is received through the second communication. Accordingly, effects the same as those described above may be obtained. Note that the method of this embodiment may be a method for controlling a colorimetric apparatus similarly to the description above.

Furthermore, as described above, power supply from an apparatus of a connection destination in the second communication is enabled in the second communication standard. By this, the battery of the electronic apparatus 100 may be charged using a battery, not illustrated, of a second apparatus of the connection destination through a power transmission line of the second communication cable, and therefore, usability of the electronic apparatus 100 may be improved. In particular, it is convenience for the user, when capacity of the battery mounted on the electronic apparatus 100 is small, the battery may be charged through the second communication.

Furthermore, as described above, the controller 130 does not disconnect the connection through the first communication when power supply is started without receiving the predetermined packet through the second communication. By this, when the second communication standard corresponds to a wired communication standard capable of transmitting both signals and electric power by a single cable and the second communication cable includes a power transmission line, the user couples the second communication cable to the second communication section 120 so that charge of the battery of the electronic apparatus 100 may be started while the electronic apparatus 100 is continuously used through the first communication. Accordingly, usability of the electronic apparatus 100 may be improved.

Figure 3:
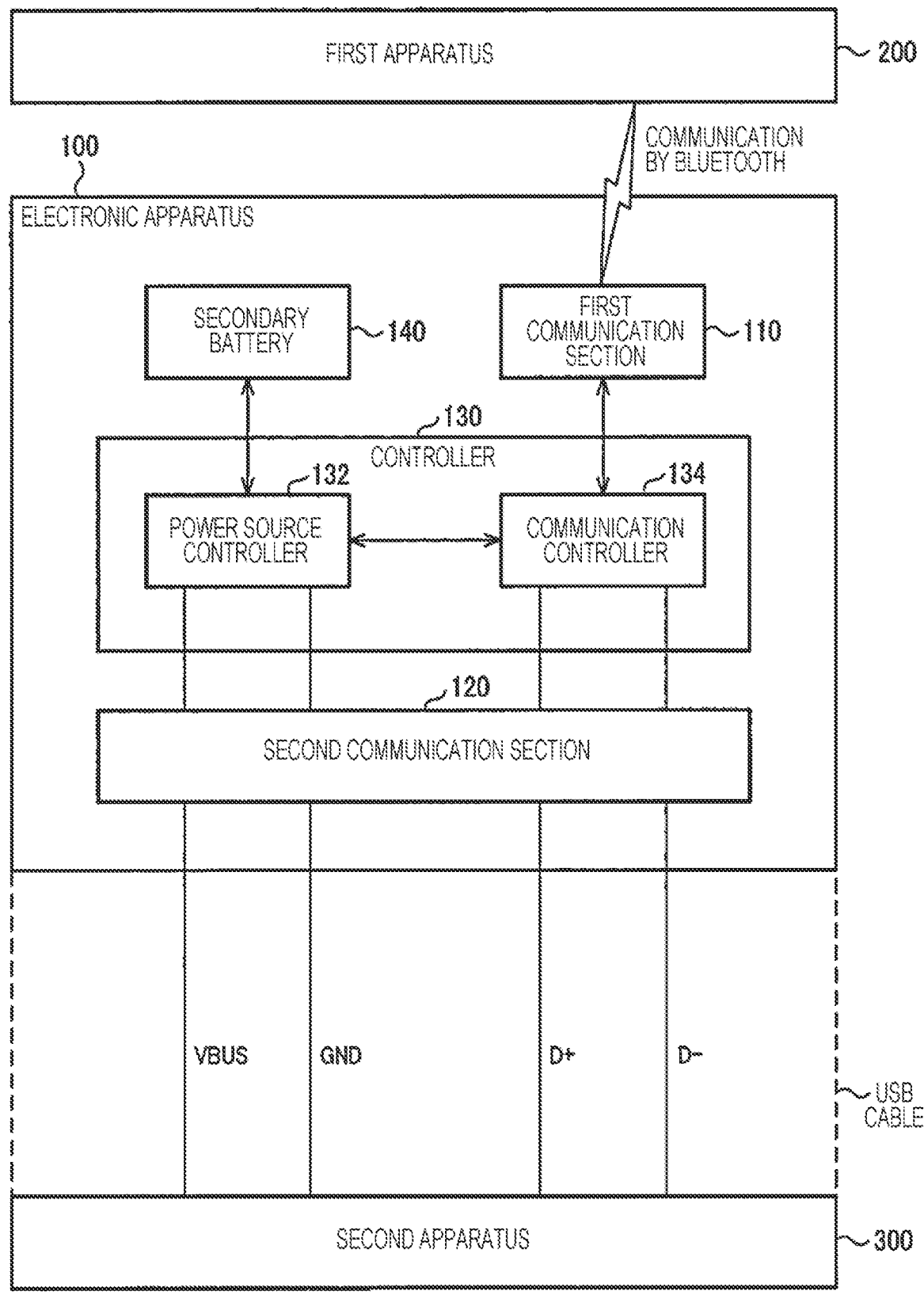
FIG. 3 is a block diagram illustrating an example of a detailed configuration of the electronic apparatus.

Note that the configuration of the electronic apparatus 100 of this embodiment is not limited to that described above, and various modifications may be made including an addition of another component. FIG. 3 is a block diagram illustrating an example of a configuration of the electronic apparatus 100 according to this embodiment. The electronic apparatus 100 of FIG. 3 includes the first communication section 110, the second communication section 120, and the controller 130 as described above, and further includes a secondary battery 140. Furthermore, the controller 130 further includes a power source controller 132 and a communication controller 134.

The secondary battery 140 is a chargeable battery and may be realized as a lithium battery, a nickel battery, or the like. Examples of the lithium battery specifically include a lithium ion secondary battery and a lithium ion polymer secondary battery. Examples of the nickel battery specifically include a nickel-hydrogen battery and a nickel-cadmium battery.

In the example of FIG. 3, the first communication section 110 communicates with the first apparatus 200 by Bluetooth. That is, the first communication standard of this embodiment is the standard of Bluetooth. Accordingly, the electronic apparatus 100 and the first apparatus 200 may be connected to each other without using an external access point, and therefore, usability of the electronic apparatus 100 may be improved. Furthermore, since the communication based on a communication standard of a low power consumption, such as BLE described above, may be used, frequency of power supply to the electronic apparatus 100 is reduced and the usability of the electronic apparatus 100 may be further improved.

Note that, in the example of FIG. 3, the second communication section 120 is coupled to the second apparatus 300 through a USB cable that is a second communication cable. That is, the second communication standard of this embodiment is the standard of the USB. By this, the electronic apparatus 100 may perform data communication with apparatuses supporting the USB. Furthermore, the USB cable includes a power source line VBUS that is a power transmission line, and therefore, as described above, the USB cable is coupled to the second communication section 120 so that the electronic apparatus 100 may start charge of the secondary battery 140 while use of the electronic apparatus 100 through the first communication is continued. Accordingly, usability of the electronic apparatus 100 may be improved.

As illustrated in FIG. 3, the USB cable includes a ground line GND, the power source line VBUS, and data lines D+ and D−. The ground line GND and the power source line VBUS are coupled to the power source controller 132. The data lines D+ and D− are coupled to the communication controller 134. The communication controller 134 controls the electronic apparatus 100 and the second communication section 120. The control performed by the communication controller 134 will be described hereinafter in detail with reference to FIG. 4.

The power source controller 132 controls power supply to the electronic apparatus 100. When electric power is supplied from the power source line VBUS, the power source controller 132 supplies electric power from the power source line VBUS to the secondary battery 140. Note that the power source controller 132 may further include a charge level detection circuit not illustrated. The power source controller 132 detects a signal indicating whether a charge level output from the charge level detection circuit is equal to or larger than a predetermined threshold value, and stops power supply to the secondary battery 140 when determining that the charge level is equal to or larger than the predetermined threshold value.

Furthermore, when another external power source may supply electric power to the electronic apparatus 100, the power source controller 132 may further include a voltage detection circuit, not illustrated, that detects coupling with the other external power source and a power source switching circuit, not illustrated, that switches a power supply source of the secondary battery 140. When receiving a signal indicating that an external power source is coupled from the voltage detection circuit, for example, the power source controller 132 controls the power source switching circuit so as to switch a power supply source that supplies electric power to the secondary battery 140 from the power source line VBUS to the external power source. On the other hand, when receiving a signal indicating that an external power source is not coupled from the voltage detection circuit, the power source controller 132 controls the power source switching circuit so as to switch a power supply source that supplies electric power to the secondary battery 140 from the external power source to the power source line VBUS. Furthermore, when the electronic apparatus 100 includes an interface capable of coupling an AC adaptor, for example, and a failure occurs in the secondary battery 140, for example, the user may use the electronic apparatus 100 in a state in which the AC adapter is coupled to the interface.

Figure 4:
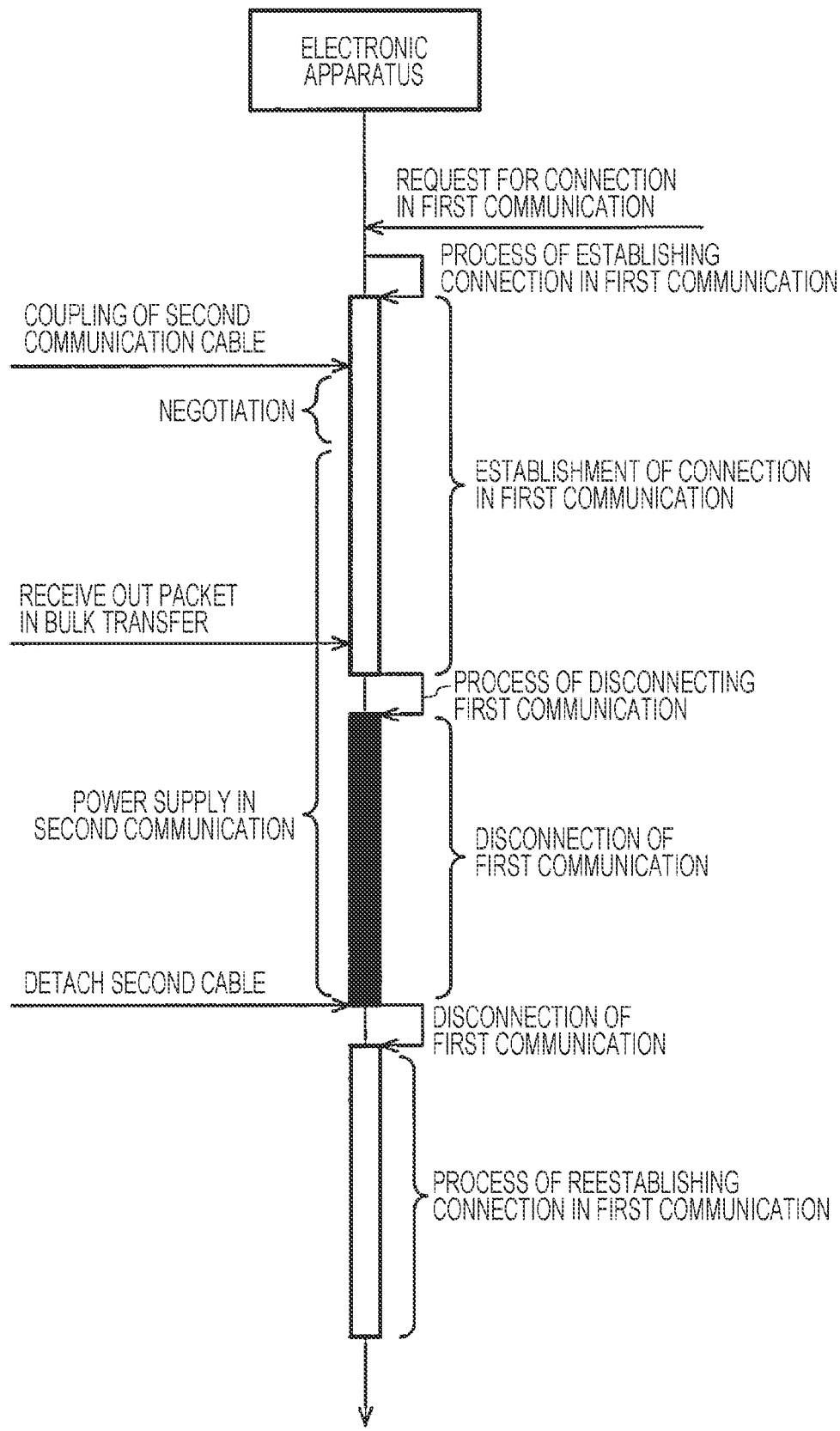
FIG. 4 is a diagram illustrating an example of a flow of a detailed process performed by the electronic apparatus.

FIG. 4 is a diagram illustrating a flow of a process performed by the electronic apparatus 100 according to this embodiment in detail. The communication controller 134 receives a request for connection through the first communication from the first apparatus 200, and thereafter, performs the first communication connection establishing process so that a connection with the first apparatus 200 through the first communication is established. By this, the user may operate the electronic apparatus 100 by the application program of the first apparatus 200. Thereafter, it is assumed that the user couples the USB cable serving as the second communication cable to the second communication section 120. The communication controller 134 performs negotiation with the second apparatus 300 that is a connection destination based on the USBBC (Battery Charging Specification) 1.2 standard at this timing. Specifically, the communication controller 134 determines the relationship between the second apparatus 300 as a host and the electronic apparatus 100 as a node and performs handshake so as to determine an appropriate power supply condition.

When the USB cable is coupled to the second communication section 120, power is supplied using the power source line VBUS. By this, the secondary battery 140 may be charged. Next, the communication controller 134 performs negotiation so as to determine a transfer speed mode from among an HS (High Speed) mode, an FS (Full Speed) mode, and a LS (Low Speed) mode. Specifically, the communication controller 134 transmits and receives information on settings, such as a transfer mode, using an OS (Operating System) of the second apparatus 300 and an end point 0 of a bidirectional logical connection. Accordingly, start of the USB communication in the determined transfer mode is enabled. Note that, examples of the transfer mode include a control transfer, a bulk transfer, an interrupting transfer, and an isochronous transfer, and communication for determining the transfer mode is performed by the control transfer. Note that detailed descriptions of the individual transfer modes are omitted since the transfer modes are widely used based on the standard of the USB. It is assumed, in this embodiment, that the bulk transfer is determined as the transfer mode by the negotiation.

When the bulk transfer is determined as the transfer mode, the communication controller 134 further provides a predetermined number of other end points in addition to the end point 0 and determines data transfer directions for the other end points. The number of the other end points differs depending on a transfer mode specifically selected. Thereafter, the communication controller 134 performs the second communication with the second apparatus 300 by means of the control transfer using the end point 0 and the bulk transfer using the end points to which the bulk transfer directions are assigned. Note that a direction of a communication packet transmitted from the second apparatus 300 serving as the host to the electronic apparatus 100 serving as the node is referred to as OUT and a reversed direction thereof is referred to as IN. Thereafter, in this embodiment, the first communication disconnecting process is performed at a timing when command transmission or the like using an OUT packet is performed from the second apparatus 300 to the electronic apparatus 100 using the end point assigned to a bulk OUT of the bulk transfer in accordance with the application program executed by the second apparatus 300. Specifically, the predetermined packet is the OUT packet in the bulk transfer in the standard of the USB. In this way, the first communication may be disconnected at an appropriate timing when use of the second communication is started.

Furthermore, the predetermined packet may be transmitted in response to an instruction issued by an application program that is for the electronic apparatus 100 and that is included in the second apparatus 300 connected in the second communication. Accordingly, the first communication is not disconnected before the application program of the second apparatus 300 connected through the second communication cable is activated, and therefore, the user may use the electronic apparatus 100 while the connection through the first communication is continued. Accordingly, the use of the connection through the second communication to the electronic apparatus 100 may be minimized, and therefore, usability of the electronic apparatus 100 may be improved.

By the method described above, the first communication is disconnected in the electronic apparatus 100. In other words, connection through the second communication is established and the user may operate the electronic apparatus 100 in accordance with the application program of the second apparatus 300.

Thereafter, it is assumed that the user detaches the second communication cable from the second communication section 120 due to a reason that the use of the application program of the second apparatus 300 is terminated or the like. The communication controller 134 performs a first communication reestablishing process at this timing. Specifically, for example, the power source controller 132 detects disconnection of the power source line VBUS and transmits a signal for disconnecting the second communication to the communication controller 134 so as to realize the first communication reestablishing process. Alternatively, the power source controller 132 may detect disconnection of the power source line VBUS and transmit a signal indicating the disconnection to the communication controller 134, and the communication controller 134 performs a process of turning on the predetermined flag described above in response to the reception of the signal, so that the first communication reestablishing process is realized. In this way, establishment of connection through the first communication between the electronic apparatus 100 and the first apparatus 200 is performed again. Accordingly, the controller 130 including the communication controller 134 performs connection through the first communication again when the wired connection of the second communication is disconnected. Accordingly, the user is not required to perform the connection through the first communication, and therefore, usability of the electronic apparatus 100 may be improved.

Note that the method of this embodiment is not limited to this, and various modifications may be made. As a modification, the communication controller 134 may perform, after the establishment of the connection through the first communication, the first communication disconnecting process when receiving a packet for instructing disconnection of the first communication in the control transfer by the end point 0 described above, for example. Note that the communication controller 134 is required to analyze that data received in the control transfer includes the instruction for disconnecting the first communication. As described above, the predetermined packet instructs the disconnection of the first communication in the control transfer based on the standard of the USB. In this way, since the packet includes the instruction for disconnecting the first communication, the first communication may be reliably disconnected based on an intension of the user.

As another modification, the communication controller 134 may perform, after the establishment of the connection through the second communication, the first communication reestablishing process when receiving a packet for instructing disconnection of the second communication in the control transfer by the end point 0 described above, for example. Note that the communication controller 134 is required to analyze that data received in the control transfer includes the instruction for disconnecting the second communication. As described above, when receiving an instruction for disconnecting the second communication from the second apparatus 300 serving as a connection destination of the second communication, the controller 130 including the communication controller 134 connects again the disconnected first communication. By this, the user may disconnect the second communication without detaching the second communication cable, and therefore, the user may operate the electronic apparatus 100 again in accordance with the application program of the first apparatus 200 while the secondary battery 140 is continuously charged.

As described above, an electronic apparatus of this embodiment includes a first communication section that performs first communication in a wireless manner based on a first communication standard, a second communication section that performs second communication in a wired manner based on a second communication standard different from the first communication standard, and a controller that controls the first communication section and the second communication section. When the connection through the second communication is performed during the connection through the first communication, the controller does not disconnect the first communication before receiving a predetermined packet through the second communication but disconnects the first communication when receiving the predetermined packet through the second communication.

Accordingly, the electronic apparatus may switch the connection from the first communication to the second communication. Furthermore, when a second communication cable is coupled to the second communication section, the electronic apparatus may continue the connection in the first communication. Furthermore, when the electronic apparatus has a battery and the second communication cable includes a power transmission line, the connection through the first communication is continued while the battery is charged, and therefore, the user may use the electronic apparatus while the connection through the first communication is continued without taking consumption of the battery into consideration. Accordingly, a period of time in the connection through the second communication is unnecessarily increased, that is, the use of the connection through the second communication may be minimized, and therefore, usability of the electronic apparatus may be improved.

Furthermore, power supply from an apparatus of a connection destination in the second communication may be enabled in the second communication standard.

Accordingly, electric power may be supplied through the power transmission line of the second communication cable. When the electronic apparatus has a battery and the apparatus of the connection destination has a battery, for example, the user may use the apparatus of the connection destination for charge of the battery of the electronic apparatus.

Furthermore, the controller may not disconnect the connection through the first communication when power supply is started before a predetermined packet is received through the second communication.

Accordingly, since the use of the electronic apparatus through the first communication is continued while the battery of the electronic apparatus is charged, usability may be improved.

Furthermore, the second communication standard may be the standard of the USB.

Accordingly, the electronic apparatus may perform data communication with apparatuses supporting the USB.

Furthermore, the predetermined packet may be an OUT packet in bulk transfer based on the standard of the USB.

Accordingly, the connection in the first communication may be maintained until the apparatus of the connection destination of the second communication is used.

Furthermore, the predetermined packet may instruct the disconnection of the first communication in control transfer based on the standard of the USB.

Accordingly, disconnection of the first communication may be performed based on an intention of the user.

Furthermore, the first communication standard may be the standard of Bluetooth.

Accordingly, the electronic apparatus may be used without an external access point and with low power consumption.

Furthermore, the predetermined packet may be transmitted in response to an instruction issued by an application program that is for the electronic apparatus and that is included in an apparatus connected in the second communication.

Accordingly, connection established in the first communication may be switched to connection established in the second communication at a more appropriate timing.

Furthermore, the controller may perform connection through the first communication again when the wired connection of the second communication is disconnected.

Accordingly, the user is not required to perform the connection established in the first communication, and therefore, usability of the electronic apparatus may be improved.

Furthermore, when the apparatus of the connection destination of the second communication issues an instruction for disconnecting the second communication, the controller may connect again the disconnected first communication.

Accordingly, the connection may be established in the first communication again without disconnecting the second communication cable from the electronic apparatus.

Furthermore, a method for controlling the electronic apparatus of this embodiment means a method for controlling the electronic apparatus including a first communication section that performs first communication in a wireless manner based on a first communication standard, and a second communication section that performs second communication in a wired manner based on a second communication standard different from the first communication standard. Furthermore, when a connection through the second communication is performed during a connection through the first communication, the first communication is not disconnected until a predetermined packet is received through the second communication but is disconnected when the predetermined packet is received through the second communication.

Note that, although this embodiment is described in detail as described above, those skilled in the art may easily understand that various modifications may be made without substantially departing from novelty and effects of the present disclosure. Accordingly, these modifications are included in the scope of the present disclosure. For example, a term described with a different term that has wider meaning or the same meaning at least once in the specification and the drawings may be replaced by the different term in any portion in the specification and the drawings. Furthermore, all combinations of the embodiment and the modifications are included in the scope of the present disclosure. Furthermore, the configurations, the operations of the electronic apparatus, the method for controlling the electronic apparatus, and the like are not limited to those described in this embodiment and various modifications may be made.

What is claimed is:

1. An electronic apparatus, comprising:
    a first communication section that performs first communication in a wireless manner based on a first communication standard;
    a second communication section that performs second communication in a wired manner based on a second communication standard that is different from the first communication standard, an electric power being supplied from an apparatus of a connection destination of the second communication to the electric apparatus in the second communication standard; and
    a controller that controls the first communication section and the second communication section, wherein
    in response to performance of connection in the second communication during connection in the first communication, a supply of the electric power from the apparatus of the connection destination of the second communication to the electronic apparatus using the second communication is started before a predetermined packet is received through the second communication,
    the controller does not disconnect the first communication until the predetermined packet is received through the second communication, and
    the controller disconnects the first communication when receiving the predetermined packet through the second communication.

2. The electronic apparatus according to claim 1, wherein the second communication standard is a standard of the universal serial bus.

3. The electronic apparatus according to claim 2, wherein the predetermined packet is an OUT packet in bulk transfer based on the standard of the universal serial bus.

4. The electronic apparatus according to claim 2, wherein the predetermined packet instructs disconnection of the first communication in control transfer based on the standard of the universal serial bus.

5. The electronic apparatus according to claim 1, wherein the first communication standard is a standard of Bluetooth.

6. The electronic apparatus according to claim 1, wherein the predetermined packet is transmitted in response to an instruction issued by an application program that is for the electronic apparatus and that is included in an apparatus connected through the second communication.

7. The electronic apparatus according to claim 1, wherein the controller connects the disconnected first communication again when the wired connection in the second communication is disconnected.

8. The electronic apparatus according to claim 1, wherein the controller connects the disconnected first communication again when receiving an instruction for disconnecting the second communication from an apparatus of a connection destination of the second communication.

9. A method for controlling an electronic apparatus including
    a first communication section that performs first communication in a wireless manner based on a first communication standard, and
    a second communication section that performs second communication in a wired manner based on a second communication standard that is different from the first communication standard, an electric power being supplied from an apparatus of a connection destination of the second communication to the electric apparatus in the second communication standard, the method comprising:
in response to performance of connection in the second communication during connection in the first communication, starting a supply of the electric power from the apparatus of the connection destination of the second communication to the electronic apparatus using the second communication before receiving a predetermined packet through the second communication;
not disconnecting the first communication until receiving the predetermined packet through the second communication; and
disconnecting the first communication when receiving the predetermined packet through the second communication.

* * * * *